United States Patent
Zhu (10) Patent No.: US 11,294,248 B2
(45) Date of Patent: Apr. 5, 2022

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jing Zhu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 58 days.

(21) Appl. No.: 16/769,330

(22) PCT Filed: Apr. 14, 2020

(86) PCT No.: PCT/CN2020/084690
§ 371 (c)(1),
(2) Date: Jun. 3, 2020

(87) PCT Pub. No.: WO2021/196276
PCT Pub. Date: Oct. 7, 2021

(65) Prior Publication Data
US 2021/0302794 A1    Sep. 30, 2021

(30) Foreign Application Priority Data
Mar. 31, 2020   (CN) .......................... 202010241619.7

(51) Int. Cl.
*G02F 1/1362*    (2006.01)
*G02F 1/1343*    (2006.01)
*G02F 1/1368*    (2006.01)

(52) U.S. Cl.
CPC .. *G02F 1/136213* (2013.01); *G02F 1/134309* (2013.01); *G02F 1/1368* (2013.01);
(Continued)

(58) Field of Classification Search
CPC ......... G02F 1/136213; G02F 1/134309; G02F 2201/40; G02F 1/136209; G02F 2201/123;
(Continued)

(56) References Cited

U.S. PATENT DOCUMENTS 9,841,641 B2    12/2017   Hirosawa
2013/0293799 A1    11/2013   Lee et al.
(Continued)

FOREIGN PATENT DOCUMENTS

CN    103389599 A    11/2013
CN    105572996 A    5/2016
(Continued)

*Primary Examiner* — James A Dudek
(74) *Attorney, Agent, or Firm* — The Roy Gross Law Firm, LLC; Roy Gross (57) ABSTRACT

A display panel and a display device are provided. The display panel includes a capacitive electrode layer and pixel electrode layer which form a storage capacitor. An orthographic projection of first capacitor units of the capacitive electrode layer on the pixel electrode layer is located within a first trunk electrode or/and a second trunk electrode. Due to the orthographic projection of the capacitive electrode layer on the pixel electrode layer is located within a trunk electrode, a display aperture ratio is increased.

14 Claims, 4 Drawing Sheets

(52) U.S. Cl.
CPC .. *G02F 1/136209* (2013.01); *G02F 2201/123* (2013.01); *G02F 2201/40* (2013.01)

(58) Field of Classification Search
CPC ............. G02F 1/1368; G02F 1/136286; G02F 1/133345; G02F 2201/121; G02F 1/136263; G02F 1/136259; H01L 27/124
See application file for complete search history.

(56) References Cited

U.S. PATENT DOCUMENTS

| | | |
|---|---|---|
| 2016/0131951 A1 | 5/2016 | Lee et al. |
| 2016/0195788 A1* | 7/2016 | Bae .................. G02F 1/136286 257/72 |
| 2018/0329241 A1* | 11/2018 | Wang .................. G02F 1/13624 |
| 2020/0050065 A1 | 2/2020 | Zang et al. |
| 2020/0241340 A1 | 7/2020 | Chen |

FOREIGN PATENT DOCUMENTS

| | | | |
|---|---|---|---|
| CN | 105589270 A | 5/2016 |
| CN | 107238990 A | 10/2017 |
| CN | 107316873 A | 11/2017 |
| CN | 110491886 A | 11/2019 |

\* cited by examiner

DISPLAY PANEL AND DISPLAY DEVICE

FIELD OF DISCLOSURE

The present disclosure relates to the field of displays, in particular to the field of display technologies, and in particular to a display panel and a display device.

BACKGROUND

With an improvement of living standards, people's demand for large-size and high-resolution display screens is increasing.

In the prior art, a storage capacitor of a large-size and high-resolution display screen is composed of a common electrode and a pixel electrode, where the opaque common electrode causes a display aperture ratio of the display screen to be low.

Therefore, a display panel and a display device are necessary to solve the above technical problems.

SUMMARY OF DISCLOSURE

In the prior art, a storage capacitor of a large-size and high-resolution display screen is composed of a common electrode and a pixel electrode, where the opaque common electrode causes a display aperture ratio of the display screen to be low. The present disclosure provides a display panel and a display device to solve the above technical problems.

To solve the above problems, technical solutions provided by the present disclosure are as follows.

A display panel includes a first substrate, a driving circuit layer disposed on the first substrate, and a pixel electrode layer disposed on the driving circuit layer, where the pixel electrode layer includes at least one first trunk electrode and at least one second trunk electrode.

The display panel further includes a capacitive electrode layer arranged in the same layer as the driving circuit layer, and the capacitive electrode layer and a portion of the pixel electrode layer together form a storage capacitor.

The capacitive electrode layer at least includes a plurality of first capacitor units, an orthographic projection of one of the first capacitor units on the pixel electrode layer is located within the first trunk electrode or/and the second trunk electrode, and the first trunk electrode is arranged vertically to the second trunk electrode.

In the display panel of the present disclosure, the first capacitor units and a source/drain layer of the driving circuit layer are arranged in the same layer.

The orthographic projection of one of the first capacitor units on the pixel electrode layer is located within the first trunk electrode.

In the display panel of the present disclosure, the first capacitor units and a gate layer of the driving circuit layer are arranged in the same layer.

The orthographic projection of one of the first capacitor units on the pixel electrode layer is located within the second trunk electrode.

In the display panel of the present disclosure, the first capacitor units and a light-shielding layer of the driving circuit layer are arranged in the same layer.

In the display panel of the present disclosure, the first capacitor units and a semiconductor layer of the driving circuit layer are arranged in the same layer.

In the display panel of the present disclosure, the capacitive electrode layer further includes a plurality of second capacitor units.

The first capacitor units and the second capacitor units are connected in parallel.

The first capacitor units and a source/drain layer of the driving circuit layer are arranged in the same layer.

The orthographic projection of one of the first capacitor units on the pixel electrode layer is located within the first trunk electrode.

The second capacitor units and any one of a light-shielding layer of the driving circuit layer or a semiconductor layer of the driving circuit layer are arranged in the same layer.

Another orthographic projection of one of the second capacitor units on the pixel electrode layer is located within the first trunk electrode.

In the display panel of the present disclosure, the capacitive electrode layer further includes a plurality of third capacitor units.

The third capacitor units are formed in a pixel light-transmitting area of the display panel.

The third capacitor units are made of a transparent material.

In the display panel of the present disclosure, the third capacitor units and the first capacitor units are connected in parallel.

The first capacitor units and a source/drain layer of the driving circuit layer are arranged in the same layer.

The orthographic projection of one of the first capacitor units on the pixel electrode layer is located with the first trunk electrode.

In the display panel of the present disclosure, the third capacitor units and the source/drain layer of the driving circuit layer are arranged in the same layer.

The first capacitor units are parallel to the third capacitor units.

In the display panel of the present disclosure, the capacitive electrode layer further includes a plurality of second capacitor units.

The second capacitor units and the first capacitor units are connected in parallel.

The second capacitor units and any one of a light-shielding layer of the driving circuit layer or a semiconductor layer of the driving circuit layer are arranged in the same layer.

Another orthographic projection of one of the second capacitor units on the pixel electrode layer is located within the first trunk electrode.

A display device includes a display panel, a polarizer layer, and a cover plate layer, where the polarizer layer and the cover plate layer are disposed on the display panel;

The display panel includes a first substrate, a driving circuit layer disposed on the first substrate, and a pixel electrode layer disposed on the driving circuit layer, where the pixel electrode layer includes at least one first trunk electrode and at least one second trunk electrode.

The display panel further includes a capacitive electrode layer arranged in the same layer as the driving circuit layer, and the capacitive electrode layer and a portion of the pixel electrode layer together form a storage capacitor.

The capacitive electrode layer at least includes a plurality of first capacitor units, an orthographic projection of one of the first capacitor units on the pixel electrode layer is located within the first trunk electrode or/and the second trunk electrode, and the first trunk electrode is arranged vertically to the second trunk electrode.

In the display device of the present disclosure, the first capacitor units and a source/drain layer of the driving circuit layer are arranged in the same layer.

The orthographic projection of one of the first capacitor units on the pixel electrode layer is located within the first trunk electrode.

In the display device of the present disclosure, the first capacitor units and a gate layer of the driving circuit layer are arranged in the same layer.

The orthographic projection of one of the first capacitor units on the pixel electrode layer is located within the second trunk electrode.

In the display device of the present disclosure, the first capacitor units and a light-shielding layer of the driving circuit layer are arranged in the same layer.

In the display device of the present disclosure, the first capacitor units and a semiconductor layer of the driving circuit layer are arranged in the same layer.

In the display device of the present disclosure, the capacitive electrode layer further includes a plurality of second capacitor units.

The first capacitor units and the second capacitor units are connected in parallel.

The first capacitor units and a source/drain layer of the driving circuit layer are arranged in the same layer.

The orthographic projection of one of the first capacitor units on the pixel electrode layer is located within the first trunk electrode.

The second capacitor units and any one of a light-shielding layer of the driving circuit layer or a semiconductor layer of the driving circuit layer are arranged in the same layer.

Another orthographic projection of one of the second capacitor units on the pixel electrode layer is located within the first trunk electrode.

In the display device of the present disclosure, the capacitive electrode layer further includes a plurality of third capacitor units.

The third capacitor units are formed in a pixel light-transmitting area of the display panel.

The third capacitor units are made of a transparent material.

In the display device of the present disclosure, the third capacitor units and the first capacitor units are connected in parallel.

The first capacitor units and a source/drain layer of the driving circuit layer are arranged in the same layer.

The orthographic projection of one of the first capacitor units on the pixel electrode layer is located with the first trunk electrode.

In the display device of the present disclosure, the third capacitor units and the source/drain layer of the driving circuit layer are arranged in the same layer.

The first capacitor units are parallel to the third capacitor units.

In the display device of the present disclosure, the capacitive electrode layer further includes a plurality of second capacitor units.

The second capacitor units and the first capacitor units are connected in parallel.

The second capacitor units and any one of a light-shielding layer of the driving circuit layer or a semiconductor layer of the driving circuit layer are arranged in the same layer.

Another orthographic projection of one of the second capacitor units on the pixel electrode layer is located within the first trunk electrode.

In the present disclosure, due to the orthographic projection of the capacitive electrode layer on the pixel electrode layer is located within a trunk electrode, a display aperture ratio is increased.

DETAILED DESCRIPTION

The present disclosure provides a display panel and a display device. In order to more clearly describe the technical solutions of the embodiments of the present disclosure, accompanying drawings to be used in the detailed description of the disclosure will be briefly described hereinbelow. It should be understood that the specific embodiments described herein are only used to explain the present disclosure, and are not used to limit the present disclosure.

Figure 1:
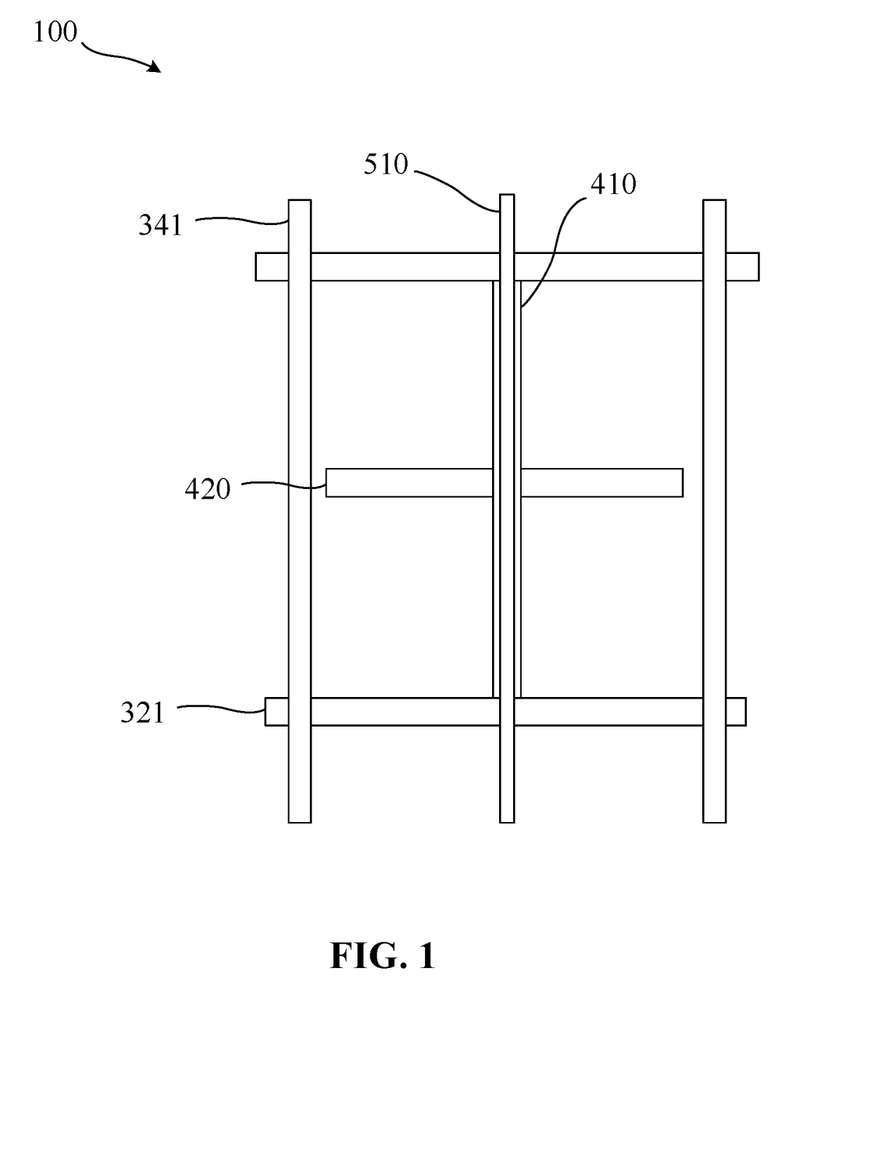
FIG. 1 is a top view of a first structure of a display panel of the present disclosure.
Figure 2:
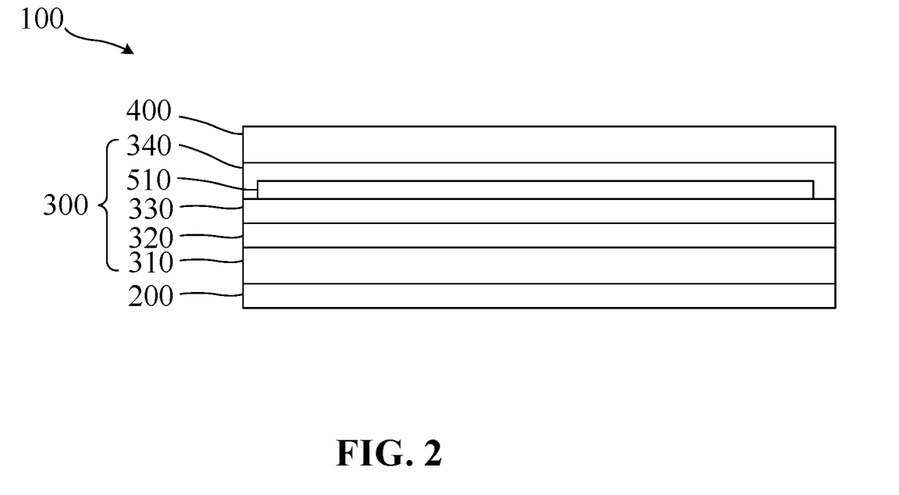
FIG. 2 is a schematic diagram of the first structure of the display panel of the present disclosure.
Figure 3:
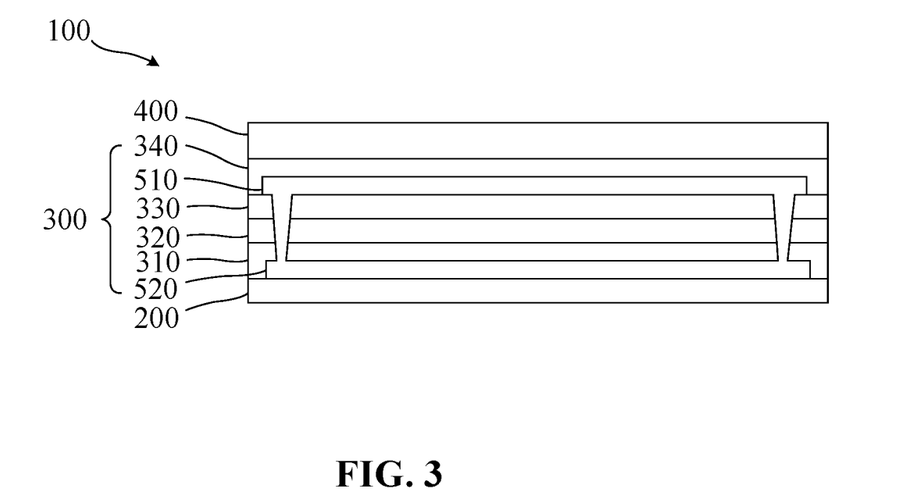
FIG. 3 is a schematic diagram of a second structure of a display panel of the present disclosure.
Figure 4:
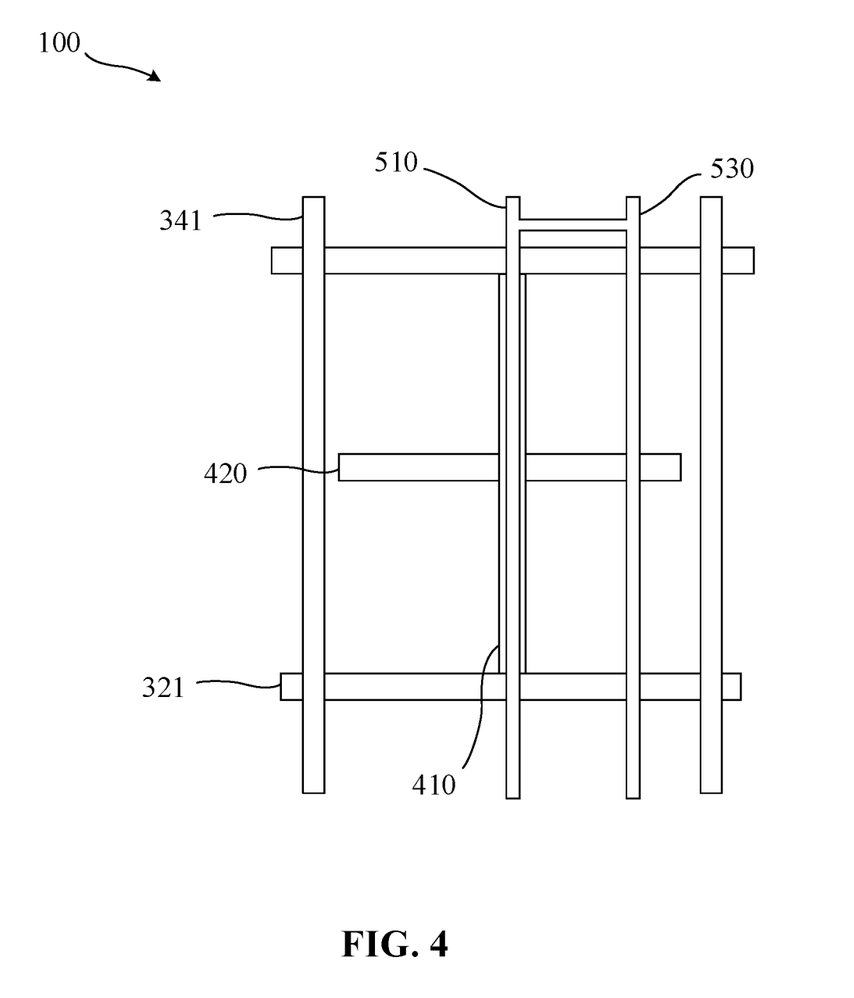
FIG. 4 is a top view of a third structure of a display panel of the present disclosure.

Please refer to FIG. 1 to FIG. 4, the present disclosure discloses a display panel 100. The display panel 100 includes a first substrate 200, a driving circuit layer 300 disposed on the first substrate 200, and a pixel electrode layer 400 disposed on the driving circuit layer 300. The pixel electrode layer 400 includes at least one first trunk electrode 410 and at least one second trunk electrode 420.

The display panel 100 further includes a capacitive electrode layer arranged in the same layer as the driving circuit layer 300. The capacitive electrode layer and a portion of the pixel electrode layer 400 together form a storage capacitor.

The capacitive electrode layer at least includes a plurality of first capacitor units 510. An orthographic projection of one of the first capacitor units 510 on the pixel electrode layer 400 is located within the first trunk electrode 410 or/and the second trunk electrode 420. The first trunk electrode 410 and the second trunk electrode 420 are arranged vertically.

In the present disclosure, due to the orthographic projection of the capacitive electrode layer on the pixel electrode layer is located within a trunk electrode, a display aperture ratio is increased.

The technical solutions of the present disclosure will now be described with reference to specific embodiments.

Please refer to FIG. 1 to FIG. 4, the display panel 100 includes the first substrate 200, a driving circuit layer 300 disposed on the first substrate 200, and the pixel electrode layer 400 disposed on the driving circuit layer 300. The pixel electrode layer 400 includes at least one first trunk electrode 410 and at least one second trunk electrode 420. The display panel 100 further includes the capacitive electrode layer arranged in the same layer as the driving circuit layer 300. The capacitive electrode layer and a portion of the pixel electrode layer 400 together form the storage capacitor.

For ease of understanding, the following embodiments use a color filter on array (COA) substrate as an example for description, and do not limit the display panel 100.

In this embodiment, the driving circuit layer 300 includes a gate layer 320, a gate insulating layer 330 disposed on the gate layer 320, and a source/drain layer 340 disposed on the gate insulating layer 330. For details, please refer to FIG. 2 and FIG. 3.

In this embodiment, the gate layer 320 includes a plurality of gate lines 321 arranged in parallel. The gate line 321 is arranged along a second direction. The second direction is parallel to the second trunk electrode, please refer to FIG. 1 and FIG. 4 for details.

In this embodiment, the source/drain layer 340 includes a plurality of data lines 341 arranged in parallel. The data line 341 and the gate line 321 are vertically arranged. The data line 341 is arranged along a first direction. The first direction is parallel to the first trunk electrode, please refer to FIG. 1 and FIG. 4 for details.

In this embodiment, the driving circuit layer 300 further includes a semiconductor layer. The semiconductor layer is an active layer. The semiconductor layer may be disposed on the source/drain layer 340. Alternatively, the semiconductor layer may be disposed on the gate insulating layer 330. Alternatively, the gate layer 320 is disposed on the semiconductor layer, and the semiconductor layer is disposed on the first substrate 200. The specific position of the semiconductor layer is not limited here.

In this embodiment, the display panel 100 further includes a color film layer and a liquid crystal layer disposed on the pixel electrode layer 400.

In this embodiment, the pixel electrode layer 400 includes a plurality of pixel electrodes, and the capacitive electrode layer may form a storage capacitor with the corresponding pixel electrode.

In this embodiment, the capacitive electrode layer at least includes a plurality of first capacitor units 510. An orthographic projection of one of the first capacitor units 510 on the pixel electrode layer 400 is located within the first trunk electrode 410 or/and the second trunk electrode 420. The first trunk electrode 410 and the second trunk electrode 420 are vertically arranged, please refer to FIG. 1 for details. The first trunk electrode 410 and the second trunk electrode 420 do not emit light, forming a shielding area. By setting the first capacitor units 510 under the trunk electrode, the first capacitor units 510 are shielded by dark lines of the trunk electrode, thereby reducing a border of the display screen, increasing a display aperture ratio of the display panel 100, and improving a display performance.

In this embodiment, the first capacitor units 510 and the source/drain layer 340 of the driving circuit layer 300 are arranged in the same layer. The orthographic projection of one of the first capacitor units 510 on the pixel electrode layer 400 is located within the first trunk electrode 410, please refer to FIG. 2 for details. The source/drain layer 340 includes a plurality data lines 341. The data lines 341 are arranged along the first direction. In order to avoid contact between the first capacitor units 510 and the data lines 341 and cause a short circuit, when the first capacitor units 510 and the source/drain layer 340 of the driving circuit layer 300 are arranged in the same layer, the orthographic projection of one of the first capacitor units 510 on the electrode layer 400 is located within the first trunk electrode 410. A wiring space of the source/drain layer 340 can be better used, to avoid contact between the first capacitor units 510 and the data lines 341 to cause the short circuit, and also setting methods, such as jumper wires, is avoided, which simplifies the manufacturing process. When the first capacitor units 510 and the source/drain layer 340 of the driving circuit layer 300 are arranged in the same layer, the capacitive electrode layer and a portion of the pixel electrode layer 400 together form the storage capacitor. A spacing between the capacitive electrode layer and the portion of the pixel electrode layer 400 is small, that is, the spacing between two electrode plates of the storage capacitor is small. The storage capacitor can be provided with a larger capacitance, and a voltage difference between the two electrode plates is greater, the storage capacitor is charged faster, the charging efficiency is higher, and the display performance is better.

In this embodiment, the first capacitor units 510 and the gate layer 320 of the driving circuit layer 300 are arranged in the same layer. The orthographic projection of one of the first capacitor units 510 on the pixel electrode layer 400 is located within the second trunk electrode 420. The gate layer 320 includes a plurality of gate lines 321, and the gate lines 321 are arranged along the second direction. In order to avoid contact between the first capacitor units 510 and the gate lines 321 and cause a short circuit, when the first capacitor units 510 and the gate layer 320 of the driving circuit layer 300 are arranged in the same layer, the orthographic projection of one of the first capacitor units 510 on the pixel electrode layer 400 is located within the second trunk electrode 420. A wiring space of the gate layer 320 can be better used, to avoid contact between the first capacitor units 510 and the gate lines 321 to cause the short circuit, and also setting methods, such as jumper wires, is avoided, which simplifies the manufacturing process.

In this embodiment, the first capacitor units 510 and the light-shielding layer 310 of the driving circuit layer 300 are arranged in the same layer. When the first capacitor units 510 and the light-shielding layer 310 of the driving circuit layer 300 are arranged in the same layer, the orthographic projection of one of the first capacitor units 510 on the pixel electrode layer 400 is located within the first trunk electrode 410 or/and the second trunk electrode 420. The first capacitor may be shielded by the trunk electrode according to a specific pattern of the light-shielding layer 310. Using the dark lines of the trunk electrode to shield the first capacitor units 510, a border of the display screen is reduced, the display aperture ratio of the display panel 100 is increased, and the display performance is improved.

In this embodiment, the first capacitor units 510 and the semiconductor layer of the driving circuit layer 300 are arranged in the same layer. When the first capacitor units 510 and the semiconductor layer of the driving circuit layer 300 are arranged in the same layer, the orthographic projection of one of the first capacitor units 510 on the pixel electrode layer 400 is located within the first trunk electrode 410 or/and the second trunk electrode 420. The first capacitor may be shielded by the trunk electrode according to a specific pattern of the semiconductor layer. Using the dark lines of the trunk electrode to shield the first capacitor units 510, a border of the display screen is reduced, the display aperture ratio of the display panel 100 is increased, and the display performance is improved.

In this embodiment, the capacitive electrode layer further includes a plurality of second capacitor units 520. The first capacitor units 510 and the second capacitor units 520 are connected in parallel. The first capacitor units 510 and the source/drain layer 340 of the driving circuit layer 300 are arranged in the same layer. The orthographic projection of one of the first capacitor units 510 on the pixel electrode layer 400 is located within the first trunk electrode 410. The second capacitor units 520 and any one of the light-shielding layer 310 of the driving circuit layer 300 or the semiconductor layer of the driving circuit layer 300 are arranged in the same layer. An orthographic projection of one of the second capacitor units 520 on the pixel electrode layer 400 is located within the first trunk electrode 410. The first capacitor units 510 and the second capacitor units 520 may be connected in parallel through via holes. Taking the second capacitor units 520 and the light-shielding layer 310 as the same layer as an example, please refer to FIG. 3 for details. The orthographic projection of one of the first capacitor units 510 on the pixel electrode layer 400 is located within the first trunk electrode 410. To facilitate parallel connection of the second capacitor units 520 and the first capacitor units 510, the orthographic projection of one of the second capacitor units 520 on the pixel electrode layer 400 is located within the first trunk electrode 410. By connecting the first capacitor units 510 and the second capacitor units 520 in parallel, a resistance of the capacitive electrode layer is reduced, thereby reducing a voltage drop of the capacitive electrode layer and improving a display uniformity, so that the storage capacitor has a larger capacitance, a voltage difference between two electrode plates is greater, the storage capacitor charges faster, a charging efficiency is higher, and the display performance is better.

In this embodiment, the capacitive electrode layer further includes a plurality of third capacitor units 530. The third capacitor units 530 are disposed in a pixel light-transmitting area of the display panel 100. The third capacitor units 530 are made of a transparent material. The third capacitor units 530 of the transparent material may not be restricted by the aperture ratio and may be set in the pixel light-transmitting area, thereby reducing the complexity of the manufacturing process. The third capacitor units 530 work independently, and form a storage capacitor with a portion of the pixel electrode layer 400, so that the storage capacitor has a larger capacitance, the voltage difference between the two electrode plates is greater, the storage capacitor charges faster, the charging efficiency is higher, and the display performance is better.

In this embodiment, the third capacitor units 530 and the first capacitor units 510 are connected in parallel. The resistance of the capacitive electrode layer is reduced, thereby reducing the voltage drop of the capacitive electrode layer, improving the display uniformity, so that the storage capacitor has a larger capacitance, the voltage difference between the two electrode plates is greater, the storage capacitor charges faster, the charging efficiency is higher, and the display performance is better.

In this embodiment, the third capacitor units 530 and the second capacitor units 520 are connected in parallel. The resistance of the capacitive electrode layer is reduced, thereby reducing the voltage drop of the capacitive electrode layer, improving the display uniformity, so that the storage capacitor has a larger capacitance, the voltage difference between the two electrode plates is greater, the storage capacitor charges faster, the charging efficiency is higher, and the display performance is better.

In this embodiment, the third capacitor units 530 and the first capacitor units 510 are connected in parallel. The third capacitor units 530 and the second capacitor units 520 are connected in parallel. The second capacitor units 520 and the first capacitor units 510 are connected in parallel. The resistance of the capacitive electrode layer is reduced to the greatest extent possible, thereby reducing the voltage drop of the capacitive electrode layer and improving the display uniformity, so that the storage capacitor has a larger capacitance, the voltage difference between the two electrode plates is greater, the storage capacitor charges faster, the charging efficiency is higher, and the display performance is better.

In this embodiment, if the first capacitor units 510 and the third capacitor units 530 are arranged in different layers, they may be connected in parallel through via holes.

In this embodiment, if the second capacitor units 520 and the third capacitor units 530 are arranged in different layers, they may be connected in parallel through via holes.

In this embodiment, the third capacitor units 530 and the source/drain layer 340 of the driving circuit layer 300 are arranged in the same layer. The first capacitor units 510 are parallel to the third capacitor units 530, please refer to FIG. 4 for details. The wiring space of the source/drain layer 340 can be better utilized to avoid contact between the first capacitor units 510 and the data lined 341 to cause a short circuit, and also other setting methods, such as jumper wires and via holes, are avoided, which simplifies the manufacturing process. When the first capacitor units 510 and the third capacitor units 530 are all arranged in the same layer as the source/drain layer 340 of the driving circuit layer 300, the capacitive electrode layer and a portion of the pixel electrode layer 400 together form the storage capacitor. A spacing between the capacitive electrode layer and the portion of the pixel electrode layer 400 is small, that is, the spacing between the two electrode plates of the storage capacitor is small, which can provide the storage capacitor with a larger capacitance, and the voltage difference between the two electrode plates is larger, so that the storage capacitor charges faster, the charging efficiency is higher, and the display performance is better. Also, the first capacitor units 510 are parallel to the third capacitor units 530 to avoid the short circuit problem and avoid a complex process of jumper wires.

In this embodiment, materials of the first capacitor units, second capacitor units, and first capacitor units are all conductive materials.

In the present disclosure, due to the orthographic projection of the capacitive electrode layer on the pixel electrode layer is located within the trunk electrode, the display aperture ratio is increased.

Figure 5:
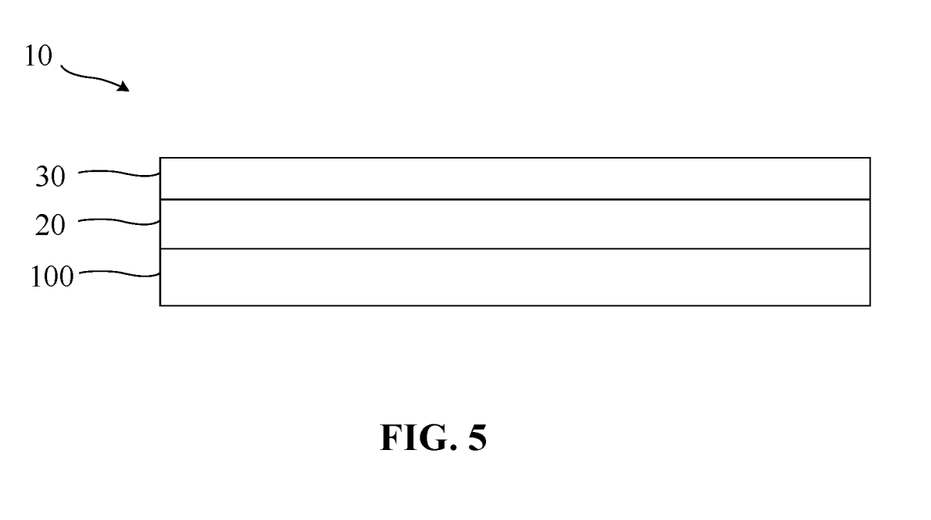
FIG. 5 is a schematic diagram of a display device of the present disclosure.

Please refer to FIG. 1 to FIG. 5, the present disclosure also discloses a display device 10. The display device 10 includes any one of the above-mentioned display panel 100, a polarizer layer 20 and a cover plate layer 30 disposed on the display panel 100.

In the present disclosure, due to the orthographic projection of the capacitive electrode layer on the pixel electrode layer is located within the trunk electrode, the display aperture ratio is increased.

For the specific structure of the display device 10, please refer to the structure of the display panel 100, and details are omitted here.

In summary, the present disclosure provides the display panel and the display device. The display panel includes a first substrate, a driving circuit layer disposed on the first substrate, and a pixel electrode layer disposed on the driving circuit layer. The pixel electrode layer includes at least one first trunk electrode and at least one second trunk electrode. The display panel further includes a capacitive electrode layer arranged in the same layer as the driving circuit layer, and the capacitive electrode layer and a portion of the pixel electrode layer together form a storage capacitor. The capacitive electrode layer at least includes a first capacitor unit, an orthographic projection of the first capacitor unit on the pixel electrode layer is located within the first trunk electrode or/and the second trunk electrode, and the first trunk electrode is arranged vertically to the second trunk electrode. In the present disclosure, due to the orthographic projection of the capacitive electrode layer on the pixel electrode layer is located within the trunk electrode, the display aperture ratio is increased.

It can be understood that, for those of ordinary skill in the art, equivalent replacements or changes can be made according to the technical scheme of the present disclosure and its inventive concept. All these changes or replacements shall fall within the protection scope of the claims attached to the present disclosure.

What is claimed is:

1. A display panel, comprising a first substrate, a driving circuit layer disposed on the first substrate, and a pixel electrode layer disposed on the driving circuit layer, wherein the pixel electrode layer comprises at least one first trunk electrode and at least one second trunk electrode;

wherein the display panel further comprises a capacitive electrode layer arranged in the same layer as the driving circuit layer, and the capacitive electrode layer and a portion of the pixel electrode layer together form a storage capacitor;

wherein the capacitive electrode layer at least comprises a plurality of first capacitor units, an orthographic projection of one of the first capacitor units on the pixel electrode layer is located within the first trunk electrode or/and the second trunk electrode, and the first trunk electrode is arranged vertically to the second trunk electrode;

wherein the capacitive electrode layer further comprises a plurality of second capacitor units;

the first capacitor units and the second capacitor units are connected in parallel;

the first capacitor units and a source/drain layer of the driving circuit layer are arranged in the same layer;

the orthographic projection of one of the first capacitor units on the pixel electrode layer is located within the first trunk electrode;

the second capacitor units and any one of a light-shielding layer of the driving circuit layer or a semiconductor layer of the driving circuit layer are arranged in the same layer; and another orthographic projection of one of the second capacitor units on the pixel electrode layer is located within the first trunk electrode.

2. The display panel as claimed in claim 1, wherein the first capacitor units and a gate layer of the driving circuit layer are arranged in the same layer; and the orthographic projection of one of the first capacitor units on the pixel electrode layer is located within the second trunk electrode.

3. The display panel as claimed in claim 1, wherein the first capacitor units and a light-shielding layer of the driving circuit layer are arranged in the same layer.

4. The display panel as claimed in claim 1, wherein the first capacitor units and a semiconductor layer of the driving circuit layer are arranged in the same layer.

5. The display panel as claimed in claim 1, wherein the capacitive electrode layer further comprises a plurality of third capacitor units;

the third capacitor units are formed in a pixel light-transmitting area of the display panel; and the third capacitor units are made of a transparent material.

6. The display panel as claimed in claim 5, wherein the third capacitor units and the first capacitor units are connected in parallel.

7. The display panel as claimed in claim 6, wherein the third capacitor units and the source/drain layer of the driving circuit layer are arranged in the same layer; and the first capacitor units are parallel to the third capacitor units.

8. A display device, comprising a display panel, a polarizer layer, and a cover plate layer, wherein the polarizer layer and the cover plate layer are disposed on the display panel;

wherein the display panel comprises a first substrate, a driving circuit layer disposed on the first substrate, and a pixel electrode layer disposed on the driving circuit layer, wherein the pixel electrode layer comprises at least one first trunk electrode and at least one second trunk electrode;

wherein the display panel further comprises a capacitive electrode layer arranged in the same layer as the driving circuit layer, and the capacitive electrode layer and a portion of the pixel electrode layer together form a storage capacitor;

wherein the capacitive electrode layer at least comprises a plurality of first capacitor units, an orthographic projection of one of the first capacitor units on the pixel electrode layer is located within the first trunk electrode or/and the second trunk electrode, and the first trunk electrode is arranged vertically to the second trunk electrode;

wherein the capacitive electrode layer further comprises a plurality of second capacitor units;

the first capacitor units and the second capacitor units are connected in parallel;

the first capacitor units and a source/drain layer of the driving circuit layer are arranged in the same layer;

the orthographic projection of one of the first capacitor units on the pixel electrode layer is located within the first trunk electrode;

the second capacitor units and any one of a light-shielding layer of the driving circuit layer or a semiconductor layer of the driving circuit layer are arranged in the same layer; and another orthographic projection of one of the second capacitor units on the pixel electrode layer is located within the first trunk electrode.

9. The display device as claimed in claim 8, wherein the first capacitor units and a gate layer of the driving circuit layer are arranged in the same layer; and the orthographic projection of one of the first capacitor units on the pixel electrode layer is located within the second trunk electrode.

10. The display device as claimed in claim 8, wherein the first capacitor units and a light-shielding layer of the driving circuit layer are arranged in the same layer.

11. The display device as claimed in claim 8, wherein the first capacitor units and a semiconductor layer of the driving circuit layer are arranged in the same layer.

12. The display device as claimed in claim 8, wherein the capacitive electrode layer further comprises a plurality of third capacitor units;

the third capacitor units are formed in a pixel light-transmitting area of the display panel; and the third capacitor units are made of a transparent material.

13. The display device as claimed in claim 12, wherein the third capacitor units and the first capacitor units are connected in parallel.

14. The display device as claimed in claim 13, wherein the third capacitor units and the source/drain layer of the driving circuit layer are arranged in the same layer; and the first capacitor units are parallel to the third capacitor units.

\* \* \* \* \*